Feb. 9, 1932.                T. SHAW                    1,844,339
                          COOKING MACHINE
                       Filed Aug. 18. 1927         8 Sheets-Sheet 4

Inventor
Thomas Shaw
By Cushman, Bryant Darby
Attorney

Feb. 9, 1932. T. SHAW 1,844,339
COOKING MACHINE
Filed Aug. 18, 1927 8 Sheets-Sheet 5

Inventor
Thomas Shaw

Feb. 9, 1932.                    T. SHAW                    1,844,339
                              COOKING MACHINE
                           Filed Aug. 18, 1927          8 Sheets-Sheet 7

Inventor
*Thomas Shaw*
By *Cushman, Bryant & Darby*
Attorneys

Patented Feb. 9, 1932

1,844,339

UNITED STATES PATENT OFFICE

THOMAS SHAW, OF WOONSOCKET, RHODE ISLAND, ASSIGNOR TO SIMPLEX TOOL COMPANY, OF WOONSOCKET, RHODE ISLAND, A CORPORATION OF RHODE ISLAND

COOKING MACHINE

Application filed August 18, 1927. Serial No. 213,884.

This invention relates to an automatic machine for cooking and frying, but is more particularly useful in the preparation of so-called batter cakes such as pan cakes, waffles and fritters.

Heretofore, the manufacture of such articles has been done almost universally by hand methods. The result has been limited production during rush periods, frequently an inferior non-uniform product and a wasting of material.

Moreover, several attendants are necessary and much time is lost in waiting for production, and the present invention aims to overcome these obstacles by providing a machine which will do substantially all of the present manual operations.

To this end automatic means are provided for delivering a predetermined amount of batter to a hot plate.

There is also employed means for separating a baked cake from the plate.

Provision is also made for baking the cake on both sides by an automatic turning construction and for delivering the cake after it has been cooked on both sides to a platter or other collecting means.

All of the mechanism is timed to give a thorough cooking but at the same time permitting all of the several operations to be conducted in their proper order and with the necessary speed.

Referring to the drawings.

The operation of this invention will briefly be described in a general way and then the particular manner of operation of the several elements will be set forth in detail.

A predetermined amount of batter is dropped upon one hot plate. When one side of the cake is cooked, as in the case of a pan cake, an automatic separating means passes between the cake and the plate to separate the cake and thereafter the plate is revolved on a pivot to throw the cake upon a second plate for cooking the opposite side. When the partially cooked cake is upon the second plate, batter is again delivered to the first plate. The first cake now upon the second plate, on being cooked on both sides, the second plate carrying it revolves on a pivot to deliver the cake to a serving plate or other receiving means. The cake which is cooking on the first plate is then transferred to the second plate and batter again discharged onto the first plate and the operation continued. The cooking plates are heated by electricity and suitable indicating means are provided for showing the heat of the plates.

A means is provided for regulating the number of such cooking operations and acting also to shut off the motor which operates the machine.

The whole machine is housed in a relatively small cabinet occupying a minimum of space and is operated by an electric motor, although other operating means may be used.

Referring to the drawings, the numeral 10 indicates the cabinet upon the top of which is mounted the motor 11 and the principal actuating mechanism and controlling means for the various parts.

The electric motor 11 has a shaft 12 which revolves in supporting brackets 13 and at one end carries a worm 14 which meshes with a gear 15.

The gear 15 is relatively large as shown, but may be of various sizes in accordance with requirements. This gear is rotatable upon a shaft 16, the gear having a suitable hub 17 on either side.

Mounted upon the shaft 16 is an eccentric 18 carrying an eccentric strap 19 provided at one end with a pawl 20. This pawl engages a ratchet wheel 21. The ratchet wheel is mounted on a hollow shaft 22 revoluble on an inner shaft 23. The shafts 22 and 23 are spaced from the shaft 16 and in a lower position and the shaft 22 is rotated by movement of the ratchet wheel. It will be seen that the shaft 22 will be intermittently rotated for a number of times equal to the number of ratchet teeth on the wheel 21, by means of the engagement of the ratchet therewith through the medium of the eccentric mechanism described. This ratchet and eccentric structure constitute the principal timing means of the machine and a ratchet wheel possessed of the desired number of teeth will be employed in accordance with the speed determined for the machine. Of course, the eccentric mechanism can also be arranged so that the pawl will pass over one or more ratchet teeth to speed up the machine as required.

Batter feeding mechanism

Figure 1:
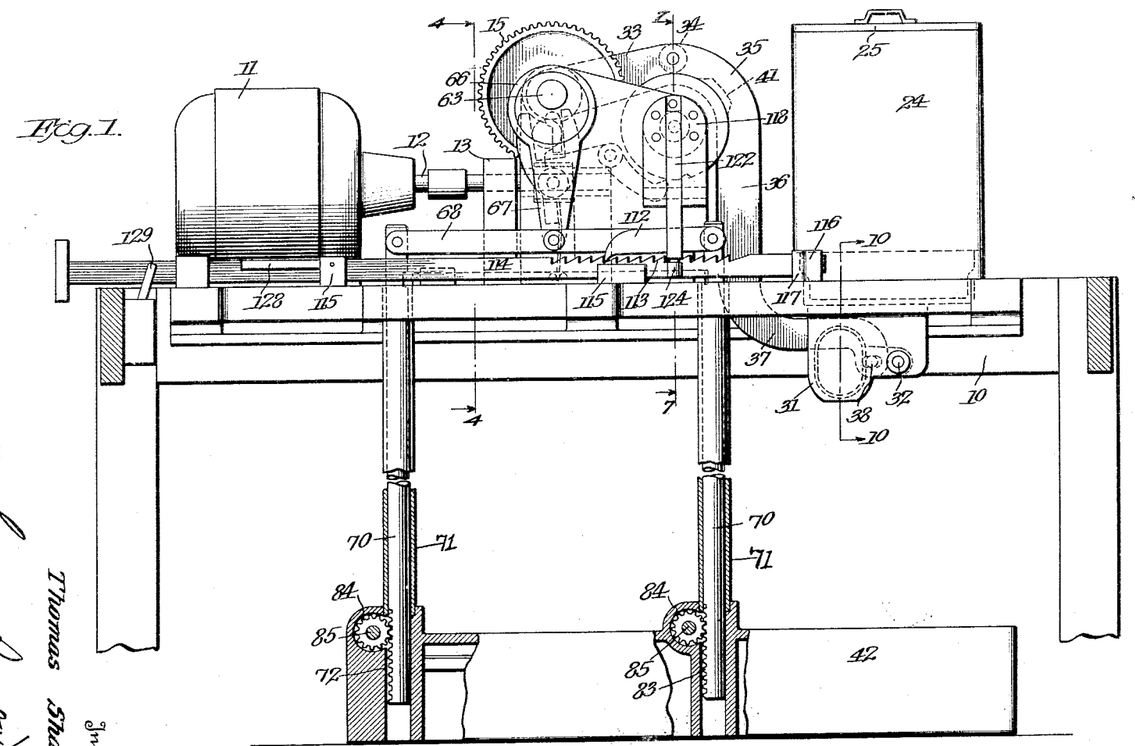
Figure 1 is a side elevation partly in section of the machine.
Figure 10:
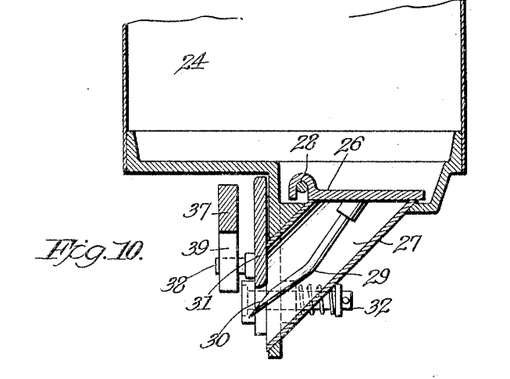
Figure 10 is a section on line 10—10 of Figure 1.

A suitable batter receptacle 24 is preferably mounted on top of the cabinet within which the machinery is enclosed and this receptacle has a suitable cover 25 and an outlet closed by a gate 26 shown in Figure 10. The outlet 26 communicates with a chute 27, the gate 26 which is pivoted at 28 cutting off communication between the outlet of the container proper and the chute. Secured to the underside of the gate 26 is a cam member in the form of a rod preferably but not necessarily bent at 29, and having its end 30 beveled and projecting beyond the mouth of the chute 27 when the bottom of the chute is open as shown in Figure 10. As shown in Figures 1 and 10, a closure 31 is pivoted at 32 to an extension adjacent the chute and the headed pivot pin 32 as shown in Figure 10, is surrounded by a spring acting to normally draw the closure 31 tight against the mouth of the chute. In Figure 10 the closure 31 is shown in open position and in Figure 1 it is shown in closed position. When in closed position the closure 31 acts upon the beveled end 30 of the rod to push the gate 26 upwardly on its pivot a distance relatively small but forming an opening sufficient to allow batter to fill the chute 27.

When the closure 31 is opened, the gate 26, since the cam 30 is released, will drop and prevent the further discharge of batter. In this manner a predetermined amount of batter usually enough to make one article or cake is discharged from the chute.

The means for operating the closure 31 will now be described. Mounted upon the shaft 16 loosely and in a manner to pivot thereon, is a lever 33 which at a point adjacent its upper curved portion is provided with a laterally projecting roller 34. The lever 33 projects upwardly as shown and is curved at 35 extending downwardly as at 36 and further curved at 37 toward the chute 27. A pin 38 is fixed to the side of the closure 31 and projects into a slot 39 in the end of the lever 33, providing a slotted pivotal connection between these parts.

Mounted on the shaft 22 to rotate therewith and spaced from the ratchet disk is a cam 40 provided in its circumference with an outwardly extending cam portion 41. When the ratchet is operated the cam 41 at the proper time is brought into contact with the roller 34 on lever 33 and the roller rides over the cam thus raising the lever. When the lever is raised, by reason of its pivoted and slotted connection with the closure 31 of the chute 27, the closure 31 is raised and the batter may flow out. The mechanism is so timed that when the cam has completed its travel under the roller and the lever 33 drops to normal position all of the batter in the chute 27 between the gate 26 and the end of the chute will have been discharged.

It will be understood when the closure 31 is open the gate 26 is closed and when the closure 31 returns to closed position it will open the gate 26 by reason of the cam 30.

In this manner a predetermined amount of batter will be delivered at proper intervals to the hot plates and it will be seen that the operation is controlled by means of the ratchet and eccentric mechanism previously described.

Hot plate feeding mechanism

Figure 6:
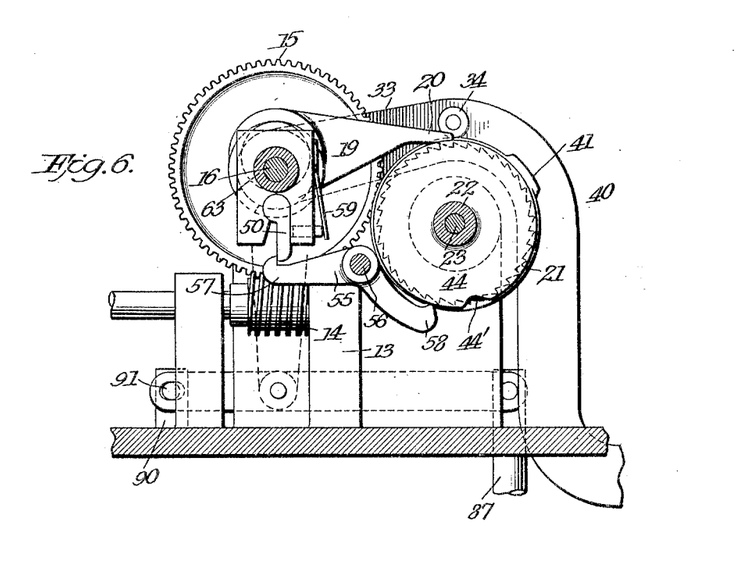
Figure 6 is a section on line 6—6 of Figure 4.
Figures 11, 12, 13:
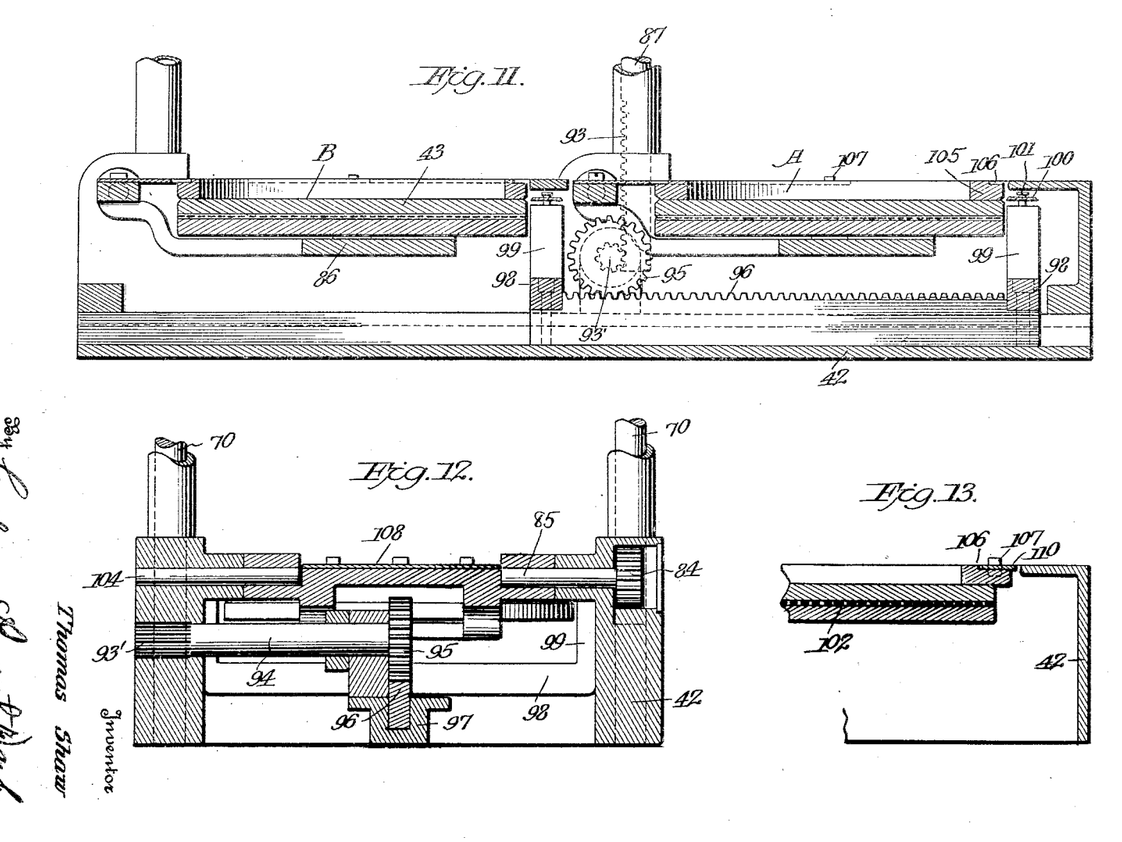
Figure 11 is a section on line 11—11 of Figure 3.
Figure 12 is a section on line 12—12 of Figure 3.
Figure 13 is a section on line 13—13 of Figure 3.

Referring to Figures 1 and 11 the cabinet 10 is provided with a base 42 upon which is mounted suitable hot plates 43. Referring to Figure 6, a disk 44 is mounted on the shaft 22 and rotates therewith. This disk is provided in its circumference with a recess 44'.

Mounted upon the shaft 16 is a sleeve 45 which is normally rotated by reason of its connection through a pin 46 with the eccentric 18. This sleeve may be termed a dog sleeve and attention is directed to Figures 6 and 8. It will be noted that at one end the sleeve is provided with a recess 47 within which is received a second sleeve 48. At one end the sleeve 48 is recessed as at 49 to receive a dog 50. The recess 49 is substantially circular and one end 51 of the dog is curved on the same radius as the radius of curvature of the recess whereby the dog will fit smoothly therein. The end 51 of the dog is provided with an extended portion 52 and the under surface 53 of this extended portion has a radius of curvature exactly the same as the radius of curvature of the inner sleeve 48 so that in the normal position of the dog the outer sleeve 45 may rotate about the inner sleeve, the break in the circumference of the inner sleeve being completed by the curved under surface 53 of the dog.

Figure 4:
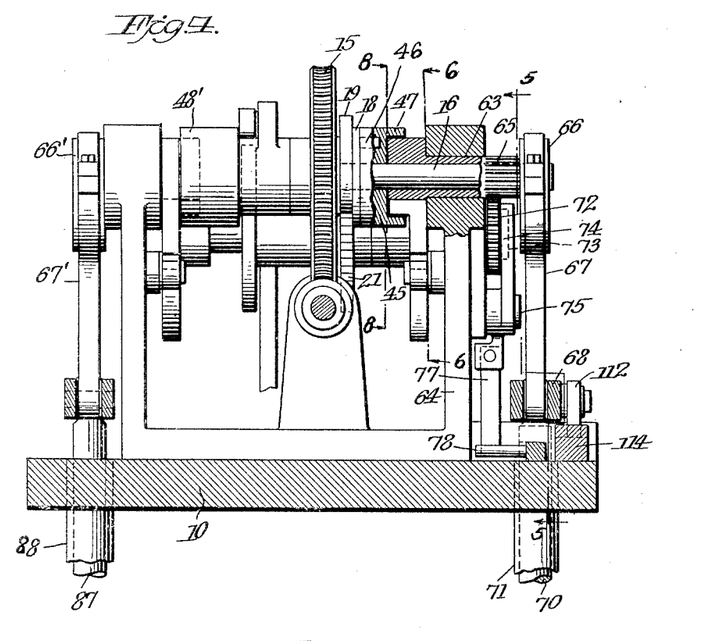
Figure 4 is a section on line 4—4 of Figure 1.

Referring to Figure 4 the assembly of the parts will be understood, the dog fitting in the recessed end of the outer sleeve 45 and in the adjacent recessed end of the inner sleeve 48. The dog has a downwardly extending portion 54 and is normally held in position to permit rotation of the outer sleeve about the inner sleeve, through the medium of a catch and ratchet member 55 pivoted to the frame at 56.

In the normal position of the parts the hook member 57 of the catch engages the portion 54 to hold the dog substantially vertical with its under surface 53 completing the circumference of the inner sleeve. This permits the outer sleeve 45, the recess 47 in which receives the adjacent end of the inner sleeve and the extended portion 52 of the dog, to freely rotate while the inner sleeve will be maintained substantially stationary.

However, when the recess 44' in the disk 44 on the shaft 22 reaches a point opposite the pawl and 58 of the member 55, the pawl 58 will drop into the recess 44 and the hook end 57 will be released from the dog 50. A flat spring 59 is attached at one side of a squared extension 60 formed integral with the inner sleeve intermediate its ends. This spring acts upon a pin 61 slidably mounted in said extension to maintain the dog in released position. It will be noted that the extension 60 has a recess 62 therein, one side of which is straight and the other side inclined whereby the dog may be held released as shown in Figure 8, the body portion of the dog 50 fitting within said recess with its end projecting therefrom for engagement with the hook 57.

Figure 8:
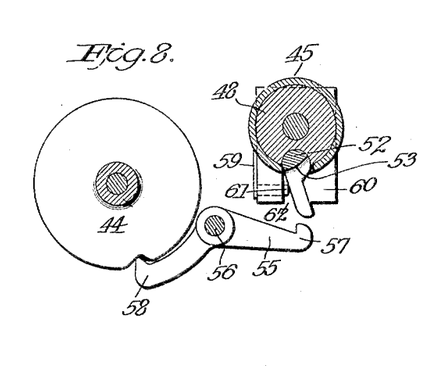
Figure 8 is a section on line 8—8 of Figure 4.
Figure 9:
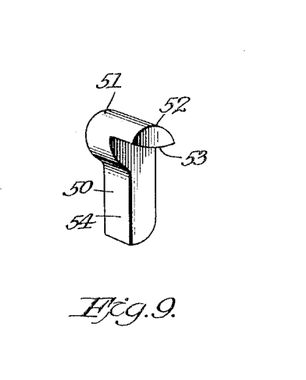
Figure 9 is a detailed perspective view of the locking door.

It will, therefore, be understood that in normal position the inner sleeve 48 will not be rotated, but when the dog is released and in the position shown in Figure 8, rotation of the outer sleeve will rotate the inner sleeve and such rotation will not terminate until the shaft 16 and inner sleeve and pawl 50 have made two revolutions, and the pawl 58 has passed out of the recess 44' in the wheel 44 to move the hook 57 back to position to catch the pawl 50.

The inner sleeve 48 extends through a bearing 63 being of reduced diameter as shown and such bearing being supported by a bracket 64 mounted upon the top of the cabinet. The adjacent end of the sleeve 48 is provided with a gear 65 preferably integral therewith, and adjacent the gear with an eccentric 66, also integral or secured to the said sleeve.

Figure 5:
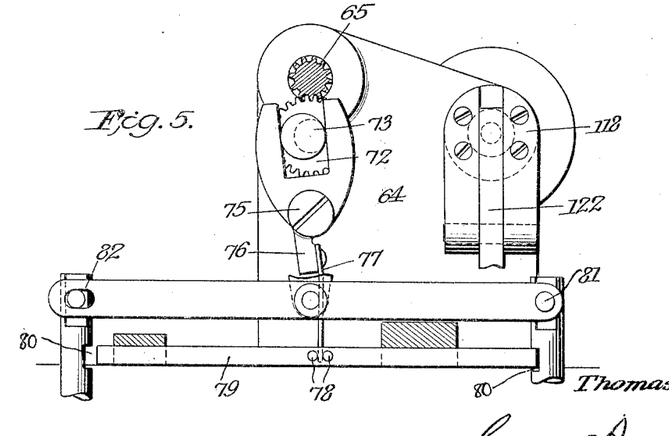
Figure 5 is a section on line 5—5 of Figure 4.

Mounted on the eccentric 66 is a strap 67 which extends downwardly and is bolted between and substantially intermediate the ends of a pair of levers 68. Secured between the ends of said levers at each end are the reduced upper ends 69 of posts 70. The posts 70 are mounted in supporting sleeves 71 which are rigid and being mounted between the base and top of the cabinet, serve as supports for the cabinet as well as guides for the posts 70. It will be understood that operation of the eccentric will raise and lower the levers 68 to slide the posts 70 within the sleeves 71. However, it is necessary and desirable when cooking an article upon both sides, that these posts be consecutively moved and to this end a locking device is employed for holding one post stationary while the other post is sliding vertically. This locking means comprises a gear 72 which engages the gear 65. The gear 72 has an eccentric 73 thereon which is mounted within a yoke member 74 as shown in Figure 5. The yoke member is pivoted at its lower end by a pivot 75 to the frame and the extension 76 of the yoke member has secured thereto on one side a flat spring member or flexible strap 77 the end of which terminates between two laterally extending pins 78 secured to a slidable locking bar 79. This bar 79 has sliding movement horizontally only between suitable guides and cannot tilt or move vertically. The posts 70 are provided with recesses 80 in their peripheries and the ends of the bar 79 slide into one or the other of these recesses in the operation of the machine.

The connection between the posts 70 and the bars 68, previously referred to, is pivotal, the securing pins 81 accomplishing this function. At one side the levers are slotted at 82 so that in addition to the pivotal connection, the pins 81 also permit a sliding relation between the levers 68 and said posts.

The operation of this construction will now be described.

As the eccentric 66 moves by reason of the movement of the inner sleeve 48 it will raise the strap 67 to raise the levers 68. At the same time, the yoke 74 by reason of the engagement of the gears 65 and 72 and the eccentric 73 will be moved on its pivot to throw the locking bar 79 into engagement with one of the posts 70 to maintain it immovable. This will cause one or the other of the pivot pins 81 to acts as a pivot and, therefore, one of the posts 70 will be raised and lowered during this movement of the eccentric 66 and levers 68. When the eccentric has completed part of its motion one of the posts 70 will be in its uppermost position and as the eccentric continues its motion, said post will be lowered to normal position as shown in Figures 1 and 5, and when its recess 80 is adjacent the end of the bar 79 the yoke 74 will move the bar 79 out of engagement with the other post to lock the first mentioned post and further movement of the eccentric and levers will cause the other post to accompany a similar upward and downward movement. The locking member is moved from one side to another as the gear rotates.

It will be seen, therefore, that but one post can slide up and down at a time because one or the other post is always locked against sliding movement by engagement of the bar 79 in the recess 80 of a particular post.

At their lower ends the posts 70 are provided with rack teeth 83 which each engage a gear 84. This gear 84 has a shaft 85 to which is rotatably connected the bottom member 86 of the hot plates 43.

It will thus be seen that movement of the posts 70 causing engagement of the rack 83 with the gear 84 will rotate the gear 84 and its shaft 85 to oscillate the hot plates. The hot plates will move through an arc which is substantially equal to a semi-circle.

In the operation of the parts, movement of one of the posts upwardly will move the hot plate which it engages upwardly through substantially a semi-circle and as the post returns, the said plate will be returned to normal position as shown in Figure 11. The other plate will then at the proper time move in a similar manner.

It will be understood that the movement of the posts 70, being timed upon the movement of the ratchet wheel and the movement of the disk 44, will occur at proper intervals when one side or the other of a particular batter product has been sufficiently cooked. It will be understood that batter placed on plate A will be cooked on one side, then turned in its transfer to plate B, where after sufficient cooking on both sides, the complete article will be passed from the machine by the plate B.

*Scraper operating mechanism*

On the opposite side of the gear 15 and at one end of the shaft 16 a sleeve 48′ similar to sleeve 48 is provided which carries an eccentric 66′ similar to the eccentric 66 and about which is carried a strap similar to the strap 67′. The operating parts for this mechanism are similar to that employed in connection with the eccentric 66 and strap 67 and need not be again described.

Figure 2:
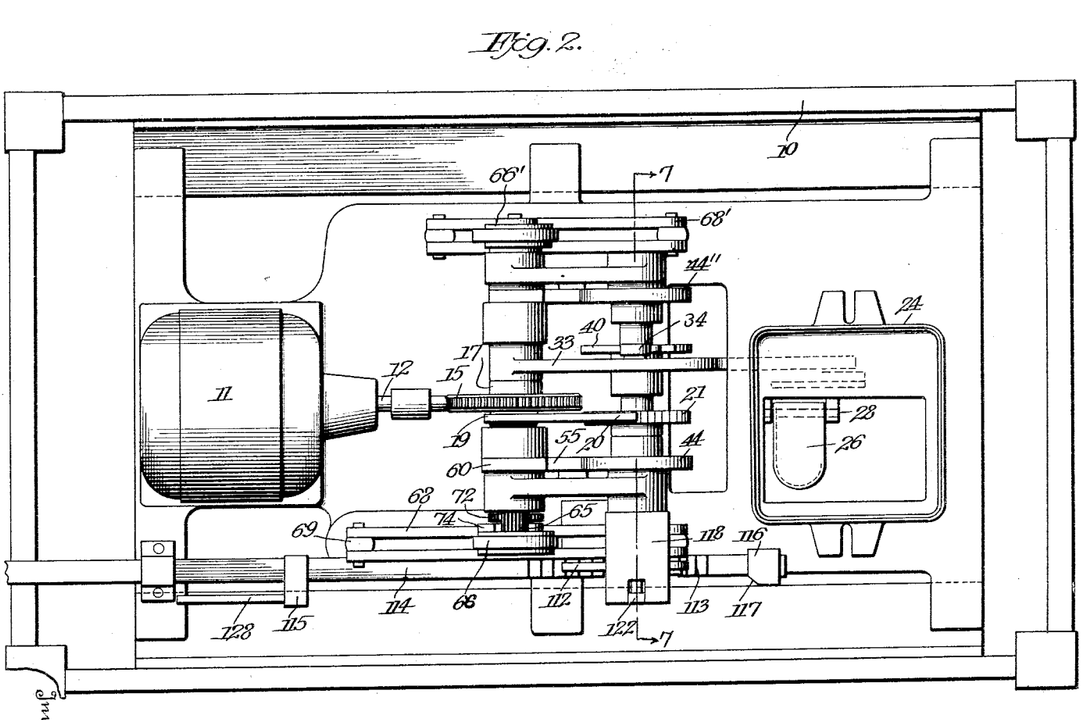
Figure 2 is a top plan view of the operating mechanism.

Referring to Figures 2 and 6, this strap 67′ is connected to levers 68′ similar to levers 68 and in the same manner.

Pivotally connected to these levers by a pin or bolt, at one end thereof, is a movable post 87, having a fixed sleeve or support 88 both similar to the members 70 and 71. The other ends of the levers are slotted as at 89 and are secured to and pivoted on an upstanding stem 90 having a pin or bolt 91 engaging in said slots. A suitable sleeve or support 92 similar to the several sleeves 71 and 88 heretofore described is employed but no post is preferably employed in this sleeve.

In view of the fact that but one post is movable no locking structure, such as bar 79 and its operating mechanism will be employed with the single movable post.

The post 87 at its lower end is provided with rack teeth 93 which engage the teeth of a gear 93′ at one end of a shaft 94 mounted to rotate on the base. The other end of the shaft carries a suitable gear 95 which meshes with the teeth of a horizontal rack 96 mounted to slide in the base for a distance equal to the length of the cooking plates. The rack slides in a track 97 or other guide way mounted on the base under the cooking plates.

Mounted upon the rack 97 and secured thereto at its ends are bars 98 each having a pair of spaced upstanding members 99 preferably formed integral with said bars. Loosely connected to each pair of upstanding members 99 is a knife member 100 the ends of which are held in place on the top of each member by screws or pins 101. The knife members, as shown, extend across the top of each pair of upstanding members defining a rectangular space. Since the knife members are passed over the faces of the cooking plates, this space is of a size to permit the plates to pass therethrough. The knife members may be adjustably mounted on the tops of the members 99 if desired. It will be understood that the upstanding members are spaced apart a distance slightly greater than the width of the hot plates and that the respective knife members are mounted at a height upon said members sufficient to just clear hot plates in their passage over the surface thereof. The knife members 100 are of very thin material and their purpose is to release that side of a pancake which is cooked from the adjacent face of a cooking plate, so that when the plate revolves as previously described, the cake will readily fall therefrom. It is to be noted that the two scrapers operate simultaneously.

The operation of this mechanism will now be briefly described.

At a suitable time in the operation of the machine when a batter product or products have been sufficiently cooked or browned, the operation of the eccentric 66′ and its strap 67′, causes the levers 68′ to pivot upon the stationary pin 91 and the movable post 87 is carried downwardly by the eccentric mechanism and levers to rotate the gear 93′ and the gear 95 which will cause the rack to travel horizontally beneath the machine in its track 97. This movement of the rack carries the knives 100 to clear each hot plate and release the cake therefrom. Further movement of the eccentric and connected mechanism will serve to raise the post after the limit of its downward movement has been reached so as to return the scrapers 100 to normal position. It will be understood that the knife mechanism is timed for operation just before the operation of the cake turning mechanism, and the disk 44″ having a recess therein similar to recess 44′ in disk 44 is positioned to assure proper movement of the knives.

The hot plates 43 are preferably electrically heated, the heating elements 102 being embedded in the plates as shown.

The cooking plates are supported on the bottom members 86, as described, which bottom members are secured to the shafts 85. In line with said shafts 85, are hinge members 104 for supporting the plates on the base opposite the shafts 84. All of the members 85 and 104, are positioned in suitable bearings in the base of the cabinet.

Mounted on each top plate is a ring or guard member 105 defining the shape and size of the article, and preventing the escape of batter from the plates. The ring member also serves to guide a partially cooked cake when it is being transferred from one plate to another and insure its proper position at all times.

This ring is cut away on its outer upper periphery as shown at 106, such cut away portion extending entirely about the ring. At diametrically opposite points in this cut away portion upwardly extending pins 107 are provided which are fitted in the ring as shown in Figure 13.

Figure 3:
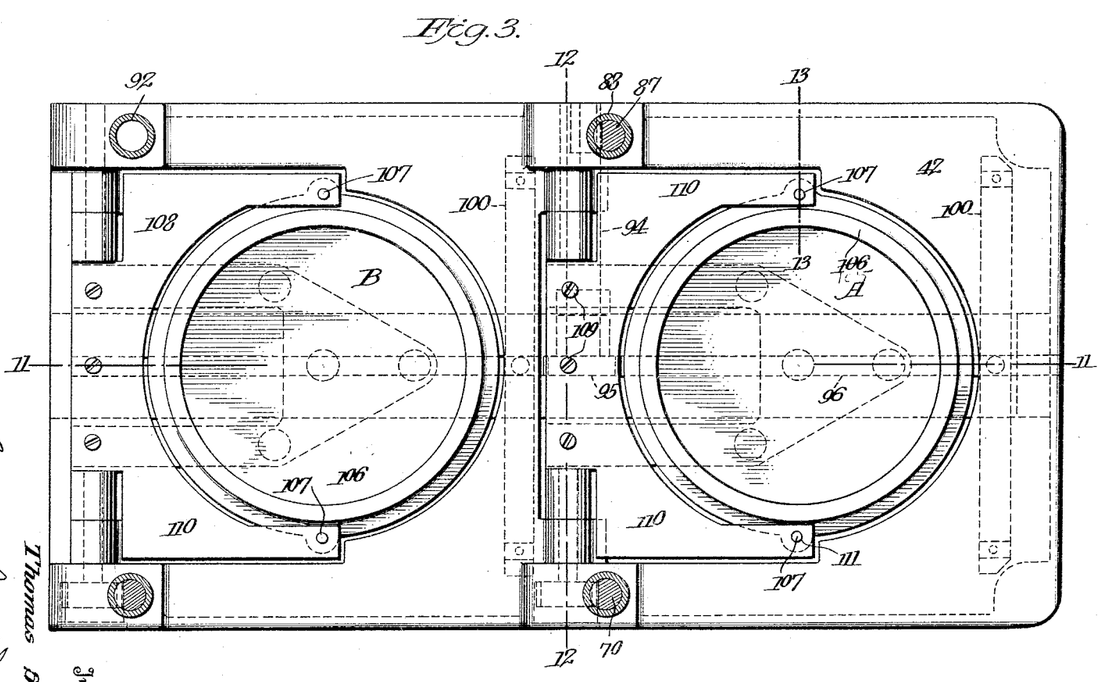
Figure 3 is a plan view of the baking plates.

A spring member 108 best seen in Figure 3 is fastened at one end to the top of the intermediate portion of the bottom member of the cooking plates, between its hinge connections, as by screws 109. This spring as shown is relatively thin and flat and is cut out to form two arms 110. At their ends these arms are formed with holes 111 which register with the pins 107, the ends of said arms resting in the cut away periphery of the ring with the pins projecting up thru the holes 11 as shown in Figure 13.

These springs 108 retain the rings 105 in position upon the plates and when the thin knife members 100 pass over the plates, they pass between each ring and the hot plate, the ring being permitted to yield by reason of the spring and at once returning to normal position when the knives have completed their movement.

*Regulating and stop mechanism*

The pin or bolt connecting the post 70 with the levers 68 adjacent the batter receptacle, is extended to provide a pivotal mounting for a pawl 112. This pawl is adapted to engage teeth 113 on a sliding member 114 mounted on the top of the cabinet and movable across the same thru guides 115.

At one end the slidable member has an enlargement 116, the outer face of which is cut away on a curve as shown at 117.

Movement of post 70 upward will raise the pawl 112 and cause it to engage the next tooth 113, and downward movement of the post will, therefore, cause the pawl to feed the bar 114 forward.

Figure 7:
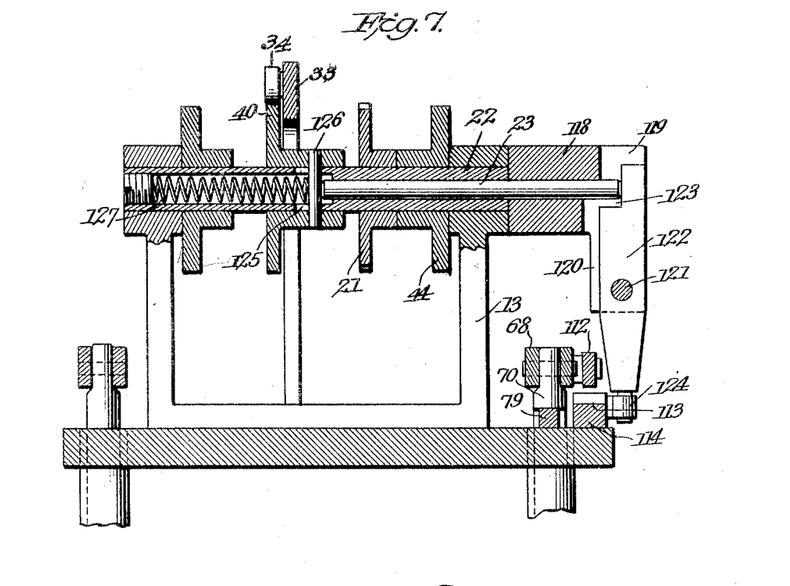
Figure 7 is a section on line 7—7 of Figure 1.

Referring to Figure 7, it will be seen that the shaft 23 is slidable within the hollow shaft 22. At one end this shaft 23 is mounted in a bearing 118 which is secured to the adjacent bracket 13. At one end the bearing is cut away or slotted as at 119 and formed with downwardly depending spaced arms 120. Pivoted within the said arms by a pin 121 is a lever 122. This lever is recessed at its upper end at 123 within which is received the adjacent end of the shaft 23 which end bears against the wall of the recess in the said lever. At its opposite end which is tapered or reduced, as shown, the said lever is provided with a roller 124. The shaft 22 is slotted at 125 within which is received a pin 126 which is fixed to the cam 40 carrying the cam 41. It will be seen that the pin 126 passes through the hub of the cam 40 and through the slot 125 in the shaft 22 whereby the cam 40 will rotate with the said shaft and also may slide thereon. A spring 127 is fixed within the sleeve so as to bear upon the pin 126 to push it outwardly and maintain the lever 122 normally in the position shown in Figure 7.

In the position of the lever 122, as shown in Figure 7, when the feed bar 114 has been fed across the cabinet until the enlarged portion 116 and its curved portion 117 has been brought into contact with roller 124, it will be seen that the roller will traverse the curved portion 117 to cause the pivoted lever 122 to turn on the pin 121 and push the shaft 23 inwardly against the pin 126 and spring 127. This will move the cam 40 carrying the cam 41 out of position to be acted upon by the roller 34 on the batter feed lever 33, so that while the device may still operate to cook and transfer any cakes upon the hot plates, the batter feed will be cut off. Mounted upon the feed bar is a fixed projection 128 which in the limit of movement of the feed bar will engage a switch lever 129 and move such switch lever to cut off the current supply to the motor. A similar lever may also be employed for cutting off the current to the heating elements of the hot plates.

Figure 14:
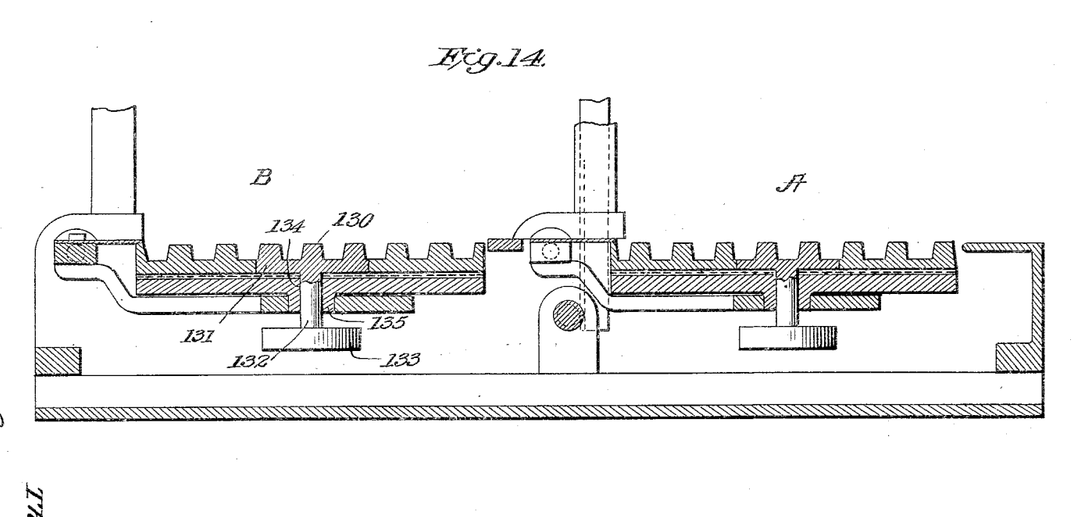
Figure 14 is a sectional view showing the invention applied for making waffles.

Referring to Figure 14, I have illustrated the invention when used for making waffles.

All of the operating mechanism previously described is utilized, and the only variation in the machine will be in the construction of the cooking plates.

In Figure 14, I have illustrated the cooking plates at 130, and they are made with serrated surfaces usual with the ordinary domestic waffle iron.

Centrally of each plate is a movable section 131 having a serrated surface coinciding with the surface of the plate. This section 131 is movable by reason of a stem 132 formed thereon, and which carries a weight 133. The stem is guided in a suitable recess 134 in the plate and in a recess 135 formed in a projection on the plate.

When it is desired to make a waffle, batter is fed to the plate B, and the mechanism is properly timed so that when the batter has covered the plate, the plate A will move to a position directly over the plate B and spaced therefrom only a sufficient distance to accommodate the batter.

Since both of the cooking plates are heated, a waffle will be readily cooked in the usual manner.

As stated, the timing mechanism similar to that previously described, is employed and at an appropriate time, the plate A will rise for return movement. As the plate A rises, the section 131 will be projected out of alignment by reason of its sliding engagement with the plate and the force of the weight 133, so that if the waffle should possibly stick to this upper plate, the section will act to separate it.

In its proper sequence, the plate B will also revolve to place the waffle upon a suitable dish, and any possibility of the waffle sticking to the plate B is eliminated through the movable section 131, which in the downward movement of the plate B toward the receiving plate will move downward out of alignment so as to release the waffle from the cooking plate.

In this manner, it will be seen that a variety of batter products may be made without any change in the machine, it being merely necessary to change the construction of the plates and to arrange the batter spout to deliver to the plate which finally discharges the cooked product from the machine, in the present instance the plate B.

It will be understood that while I have illustrated but two cooking plates, the machine may obviously be enlarged to include any desired number and various modifications may be resorted to without departing from the spirit of the appended claims.

What I claim is:

1. In an apparatus of the class described, a cooking element, means operating said element to turn a cooked product, and means moving between said element and the product to release the product and timed to operate prior to the turning thereof.

2. In an apparatus of the class described, means for supplying material to be cooked, a stationary base, cooking elements pivotally connected to said base for receiving and cooking material, means moving one of said elements to turn the material for cooking it upon both sides, and means intermittently actuating all of said means and said elements.

3. In an apparatus of the class described, means for supplying material to be cooked, a stationary base, cooking elements pivotally connected to said base for receiving and cooking material, means moving said elements to turn the material for cooking it upon both sides and delivering it from the apparatus, and means intermittently actuating all of said means and said elements.

4. In an apparatus of the class described, means for supplying material to be cooked, a stationary base, cooking elements pivotally connected to said base for receiving and cooking material, means moving one of said elements to turn the material for cooking it upon both sides, means for separating cooked articles from said elements, and means intermittently actuating all of said means and said elements.

5. In an apparatus of the class described, a material supply means, a stationary base having cooking elements pivotally connected thereto for receiving and cooking material, means moving one of said elements to turn the material for cooking it on both sides, means for regulating the number of cooking operations, and means progressively actuating all of said means and elements in timed relation.

6. In an apparatus of the class described, a material supply means, a stationary base having cooking elements pivotally connected thereto for receiving and cooking material, means moving said elements to turn the material for cooking it on both sides and delivering it from the apparatus, and means progressively actuating all of said means and elements in timed relation.

7. In an apparatus of the class described, material supply means, means for receiving and cooking the material comprising movable members, means for separating the cooked product from said cooking means prior to movement of the members, means for regulating the number of cooking operations, and means intermittently actuating all of said means and members in timed relation.

8. In an apparatus of the class described, material supply means, a stationary base having cooking elements pivotally connected thereto for receiving and cooking material, means moving one of said elements to turn the material for cooking it on both sides, means automatically for stopping the apparatus, and means actuating all of said means and elements in timed relation.

9. In an apparatus of the class described, material supply means, a stationary base having cooking elements pivotally connected thereto for receiving and cooking material, means moving said elements to turn the material for cooking it on both sides and delivering it from the apparatus, means automatically for stopping the apparatus, and means actuating all of said means and elements in timed relation.

10. In an apparatus of the class described, material supply means, means for receiving and cooking material successively fed from said supply means, means for regulating the number of cooking operations, means for automatically stopping the apparatus, and means for progressively actuating all of said means.

11. In an apparatus of the class described, means for feeding a predetermined amount of material, means for receiving said material and cooking it for a predetermined length of time, means actuating said cooking means to move the material for cooking it on both sides and delivering a cooked product from the apparatus, means for separating the cooked product prior to its movement from the cooking means, and means progressively actuating all of said beforementioned means.

12. In an apparatus of the class described, a single means operated from a source of power for intermittently actuating in timed relation a plurality of cooperating elements including material supply means, and cooking means, said cooking means comprising a stationary base having cooking elements pivotally connected thereto for receiving and cooking material, and means moving one of said elements to turn the material for cooking it on both sides.

13. In an apparatus of the class described, a single means operated from a source of power for intermittently actuating in timed relation a plurality of cooperating elements including material supply means, and cooking means, said cooking means comprising a stationary base having cooking elements pivotally connected thereto for receiving and cooking material and means moving one of said elements to turn the material for cooking it on both sides, and means automatically for shutting off the source of power.

14. In an apparatus of the class described, a stationary base, a plurality of cooking elements pivotally connected thereto, one element cooking the material on one side, means moving said element to deliver the material to another element for cooking the opposite side, means moving said second element to deliver the cooked product from the apparatus, and means for operating all of said means in timed relation.

15. In an apparatus of the class described, a stationary base, a plurality of cooking elements pivotally connected thereto, one element cooking the material on one side, means moving said element to deliver the material to another element for cooking the opposite side, means moving said second element to deliver the cooked product from the apparatus, and means for operating all of said means in timed relation, and means holding one of said elements inactive during operation of the other.

16. In an apparatus of the class described, pivotally mounted cooking elements, means for moving said elements to deliver a partially cooked product from one element to the other for cooking the product on both sides, and means mounted on said elements for guiding the product in its movement and reception from one element to the other.

17. In an apparatus of the class described, a source of power, a timing mechanism operated thereby, said mechanism successively and continuously operating in proper sequence a plurality of members including a reservoir for delivering a predetermined quantity of material to be cooked, movable cooking plates receiving the material and having a heating means associated therewith to cook the material, means for moving said plates to deliver a partially cooked product from one plate to another to cook it on both sides and to deliver the cooked product from the machine, members adapted to separate the cooked product from the cooking plates prior to its movement from one plate to the other and from the apparatus, means for maintaining one plate inactive during the transfer of the cooked product, and means for shutting off the supply of material at a predetermined number of operations and for stopping the apparatus.

18. In an apparatus of the class described, a stationary base, cooking elements pivotally connected thereto and movable in an arcuate path, one to overlie the other and the second to deliver a cooked product from the machine, and automatic means for operating said elements in timed relation.

19. In an apparatus of the class described, a stationary base, cooking elements pivotally connected to said base, one of said elements being movable in an arcuate path to overlie the other, and another of said elements being movable in an arcuate path to deliver a cooked product from the machine, and means for automatically moving said elements in the sequence of the cooking operation and for maintaining one element inactive during movement of another element.

20. In an apparatus of the class described, means for supplying material to be cooked, a stationary base, cooking elements movable on spaced substantially parallel disposed pivots fixed to said base for receiving material from said supply means and cooking said material, means for moving one of said elements to turn the material and deliver it to another element for cooking it upon both sides and means successively operating all of said means and said elements.

21. In an apparatus of the class described, material supply means, means for receiving and cooking the material comprising movable members, means for separating the cooked product from said cooking means, means for setting the apparatus for a predetermined number of cooking operations and means operating all of said means and elements in proper sequence and for automatically stopping the machine at the end of the predetermined number of cooking operations.

22. In an apparatus of the class described, movable cooking elements, time controlled means for moving one of said elements to deliver a partially cooked product to the other element and for moving the second element to deliver a cooked product from the apparatus, said time controlled means also actuating a separating means for separating the cooked product from the elements at the proper sequence of the movement of said elements.

In testimony whereof I have hereunto set my hand.

THOMAS SHAW.